US008598555B2

(12) United States Patent
Guerrero et al.

(10) Patent No.: US 8,598,555 B2
(45) Date of Patent: Dec. 3, 2013

(54) FINGER SENSING APPARATUS WITH SELECTIVELY OPERABLE TRANSMITTING/RECEIVING PIXELS AND ASSOCIATED METHODS

(75) Inventors: Alexander Guerrero, Malabar, FL (US); Gordon S. Franza, Rockledge, FL (US); Peter E. Sherlock, Viera, FL (US)

(73) Assignee: Authentec, Inc., Melbourne, FL (US)

( * ) Notice: Subject to any disclaimer, the term of this patent is extended or adjusted under 35 U.S.C. 154(b) by 463 days.

(21) Appl. No.: 12/622,724

(22) Filed: Nov. 20, 2009

(65) Prior Publication Data

US 2011/0122059 A1 May 26, 2011

(51) Int. Cl.
G06K 5/00 (2006.01)
G06K 9/00 (2006.01)

(52) U.S. Cl.
USPC ............................ 250/556; 382/124; 345/156

(58) Field of Classification Search
None
See application file for complete search history.

(56) References Cited

U.S. PATENT DOCUMENTS

| 5,940,526 | A | 8/1999 | Setlak et al. | 382/124 |
|---|---|---|---|---|
| 5,953,441 | A | 9/1999 | Setlak | 382/124 |
| 6,483,929 | B1 * | 11/2002 | Murakami et al. | 382/115 |
| 6,525,547 | B2 | 2/2003 | Hayes | 324/662 |
| 6,671,392 | B1 * | 12/2003 | Shigematsu et al. | 382/124 |
| 7,358,514 | B2 * | 4/2008 | Setlak et al. | 250/556 |
| 7,361,919 | B2 * | 4/2008 | Setlak | 250/556 |
| 7,433,114 | B2 | 10/2008 | Van Brocklin et al. | 359/296 |
| 7,433,729 | B2 * | 10/2008 | Setlak et al. | 600/473 |
| 8,073,209 | B2 * | 12/2011 | McClurg et al. | 382/124 |
| 2001/0025532 | A1 | 10/2001 | Kramer | 73/862.68 |
| 2005/0063573 | A1 * | 3/2005 | Setlak et al. | 382/124 |
| 2005/0073324 | A1 | 4/2005 | Umeda et al. | 324/662 |
| 2007/0063816 | A1 * | 3/2007 | Murakami et al. | 340/5.82 |
| 2007/0262244 | A1 | 11/2007 | Padinger et al. | 250/214 R |
| 2008/0062139 | A1 * | 3/2008 | Hotelling et al. | 345/173 |
| 2008/0062148 | A1 | 3/2008 | Hotelling et al. | 345/174 |
| 2008/0297487 | A1 * | 12/2008 | Hotelling et al. | 345/173 |
| 2009/0252386 | A1 | 10/2009 | Dean et al. | 382/124 |
| 2010/0001973 | A1 * | 1/2010 | Hotelling et al. | 345/174 |
| 2010/0008545 | A1 * | 1/2010 | Ueki et al. | 382/115 |
| 2010/0113952 | A1 * | 5/2010 | Raguin et al. | 600/509 |

(Continued)

FOREIGN PATENT DOCUMENTS

DE 102005051530 5/2007 ............... G01D 5/24

OTHER PUBLICATIONS

Maltoni et al., "Chapter 2: Fingerprint sensing", Handbook of Fingerprint recognition, Jan. 2003, pp. 1-15.

(Continued)

Primary Examiner — Dismery Mercedes
(74) Attorney, Agent, or Firm — Allen, Dyer, Doppelt, Milbrath & Gilchrist, P.A.

(57) ABSTRACT

A finger sensing device may include an integrated circuit (IC) substrate and an array of pixels on the IC substrate. Each pixel may be selectively operable in at least a receiving mode for receiving radiation from an adjacent finger, or a transmitting mode for transmitting radiation into the adjacent finger. The finger sensing device may also include a controller coupled to the array of pixels for selectively operating at least one first pixel in the receiving mode, and while selectively operating at least one second pixel in the transmitting mode. Each pixel may also be selectively operable in a mask mode for neither receiving nor transmitting radiation. The controller may also selectively operate at least one third pixel in the mask mode while selectively operating the at least one first and second pixels in the receiving and transmitting modes.

23 Claims, 7 Drawing Sheets

(56) References Cited

U.S. PATENT DOCUMENTS

2010/0328033 A1* 12/2010 Kamei .................. 340/5.82
2011/0007048 A1* 1/2011 Fratti et al. .................. 345/207

OTHER PUBLICATIONS

Setlak, "Chapter 2: Advances in fingerprint sensors using RF imaging techniques" Jan. 2001, pp. 1-14.

* cited by examiner

FIG. 6

FINGER SENSING APPARATUS WITH SELECTIVELY OPERABLE TRANSMITTING/RECEIVING PIXELS AND ASSOCIATED METHODS

FIELD OF THE INVENTION

The present invention relates to the field of electronics and, more particularly, to finger sensors and related methods.

BACKGROUND OF THE INVENTION

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A particularly advantageous approach to fingerprint sensing is disclosed in U.S. Pat. No. 5,953,441 to Setlak. The fingerprint sensor is an integrated circuit sensor that drives the user's finger with an electric field signal and senses the electric field with an array of electric field sensing pixels on the integrated circuit substrate.

Such an electric field fingerprint sensor includes a finger sensing package surrounding the IC substrate and a drive ring carried by the package to drive the user's finger with an electric field signal. Moreover, drive or excitation electronics are typically used in conjunction with the drive electrode. For example, an excitation drive amplifier may be used that drives the finger, via the drive ring, with a signal that may be typically in the range of about 1 KHz to 1 MHz.

A finger sensing IC typically includes additional pins for coupling to the drive ring or drive electrode. Additionally, an additional resistor and a transient voltage suppressor may both be used when coupling a drive ring to the drive circuitry. Still further, in the case of a drive ring, the drive ring may increase the overall size of the finger sensor. In other words, more space is needed for using the drive ring, and thus the overall area of the finger sensor is also increased.

SUMMARY OF THE INVENTION

In view of the foregoing background, it is therefore an object of the present invention to provide a finger sensing apparatus having a reduced size and including a reduced number of components.

This and other objects, features, and advantages in accordance with the present invention are provided by a finger sensing apparatus that may include an integrated circuit (IC) substrate, and an array of pixels on the IC substrate. Each pixel may be selectively operable in at least a receiving mode for receiving radiation from an adjacent finger, or a transmitting mode for transmitting radiation into the adjacent finger. The radiation received or transmitted from the receiving or transmitting pixels may include electric field radiation, for example. The finger sensing apparatus may also include a controller coupled to the array of pixels for selectively operating at least one first pixel in the receiving mode, and while selectively operating at least one second pixel in the transmitting mode. Accordingly, rather than exciting an external bezel or drive ring, selectively operating pixels in the array of pixels reduces the size and number of components for the finger sensor apparatus.

Each pixel may also be selectively operable in a mask mode for neither receiving nor transmitting radiation. The controller may also selectively operate at least one third pixel in the mask mode while selectively operating the at least one first and second pixels in the receiving and transmitting modes respectively. The controller may selectively operate the at least one third pixel in the mask mode between the at least one first and second pixels in the receiving and transmitting modes respectively. The at least one third pixel selectively operating in the mask mode advantageously reduces interference between the receiving and transmitting pixels, and also reduces a capacitive load, for example.

The array of pixels may include an array of rows and columns of pixels, for example. The controller may selectively operate at least one first column of the first pixels in the receiving mode, and the controller may selectively operate at least one second column of second pixels operating in the transmitting mode, for example.

The controller may also selectively operate, at least one third column of third pixels in the mask mode positioned between the columns of first and second pixels in the receiving and transmitting modes. Alternatively, the controller may selectively operate the at least one third pixel between the plurality of columns of second pixels in the transmitting mode, for example, to define a perimeter of pixels in the transmitting mode to further reduce the capacitive load and interference with the pixels in the receiving mode.

The finger sensor apparatus may also include a finger sensor package surrounding the IC substrate and being devoid of another electrode operated by the controller, for example. This may advantageously reduce the overall size of the finger sensor apparatus.

A method aspect is directed to a method of using a finger sensing apparatus that may include a controller coupled to an array of pixels on an integrated circuit substrate. Each pixel may be selectively operable in at least a receiving mode for receiving radiation from an adjacent finger, or a transmitting mode for transmitting radiation into the adjacent finger. The method may include using the controller to selectively operate at least one first pixel in the array of pixels in the receiving mode, for example.

The method may also include using the controller to selectively operate at least one second pixel in the transmitting mode while the at least one first pixel operates in the receiving mode. Each pixel may also be selectively operable in a mask mode for neither receiving nor transmitting radiation. The method may further include using the controller to selectively operate at least one third pixel in the mask mode while selectively operating the at least one first and second pixels in the sensing and transmitting modes respectively.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
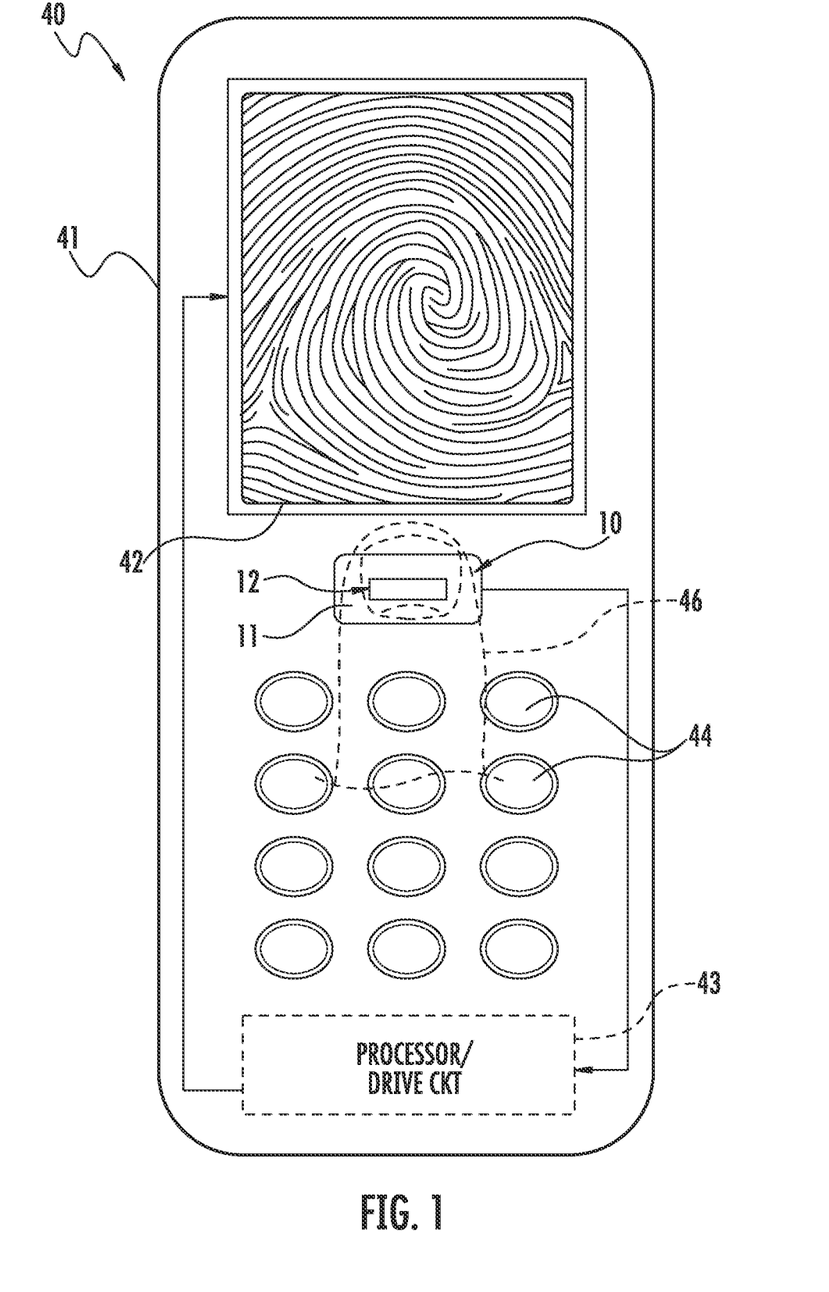
FIG. 1 is a schematic plan view of a cellular telephone including a finger sensing apparatus in accordance with the present invention.

Referring initially to FIG. 1, embodiments of a finger sensing apparatus package 10 in accordance with the invention are now described. The finger sensing apparatus 10 is illustratively mounted on an exposed surface of a candy bar-type cellular telephone 40. The illustrated candy bar-type cellular telephone 40 is relatively compact and does not include a flip cover or other arrangement to protect the finger sensing apparatus 10 as may be done in other types of cellular phones. Of course, the finger sensing apparatus 10 can also be used with these other more protective types of cell phones as will be appreciated by those skilled in the art. The finger sensing apparatus 10 can also be used with other portable and stationary electronic devices as well. The increased durability and ruggedness of the finger sensing apparatus 10 will permit its widespread use even when exposed.

The cellular telephone 40 includes a housing 41, a display 42 carried by the housing, and processor/drive circuitry 43 also carried by the housing and connected to the display and to the finger sensor package 10. An array of input keys 44 are also illustratively provided and used for conventional cellphone dialing and other applications as will be appreciated by those skilled in the art.

The finger sensing apparatus 10 may be of the slide type where the user's finger 40 slides over the sensing area to generate a sequence of finger images. Alternatively, the finger sensing apparatus 10 could be of the static placement type, where the user simply places his finger onto the sensing surface to generate a finger image. Of course, the finger sensing apparatus 10 package may also include circuitry embedded therein and/or in cooperation with the processor/drive circuit 43 to provide menu navigation and selection functions as will be appreciated by those skilled in the art.

Figure 2:
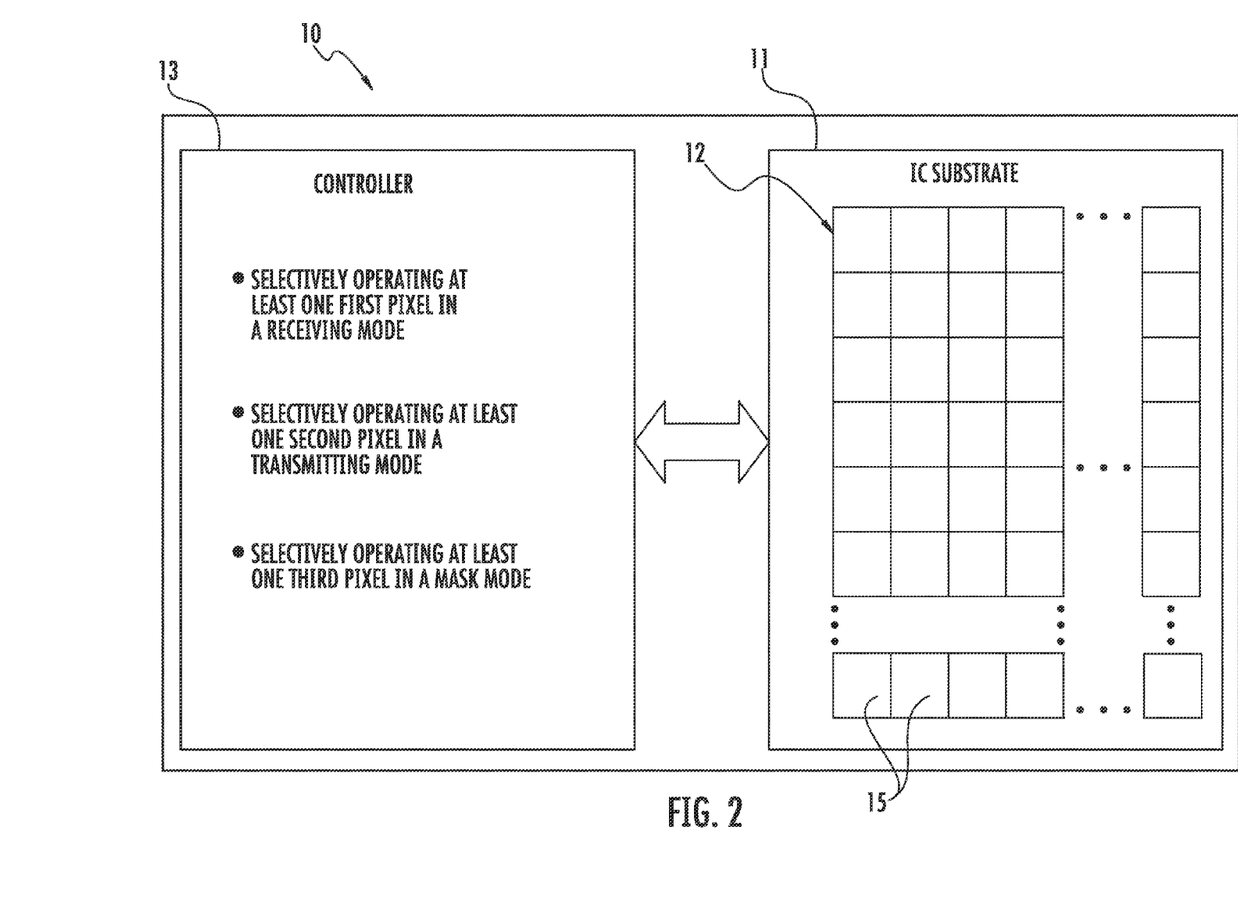
FIG. 2 is a schematic diagram of the finger sensing apparatus shown in FIG. 1.
Figure 3:
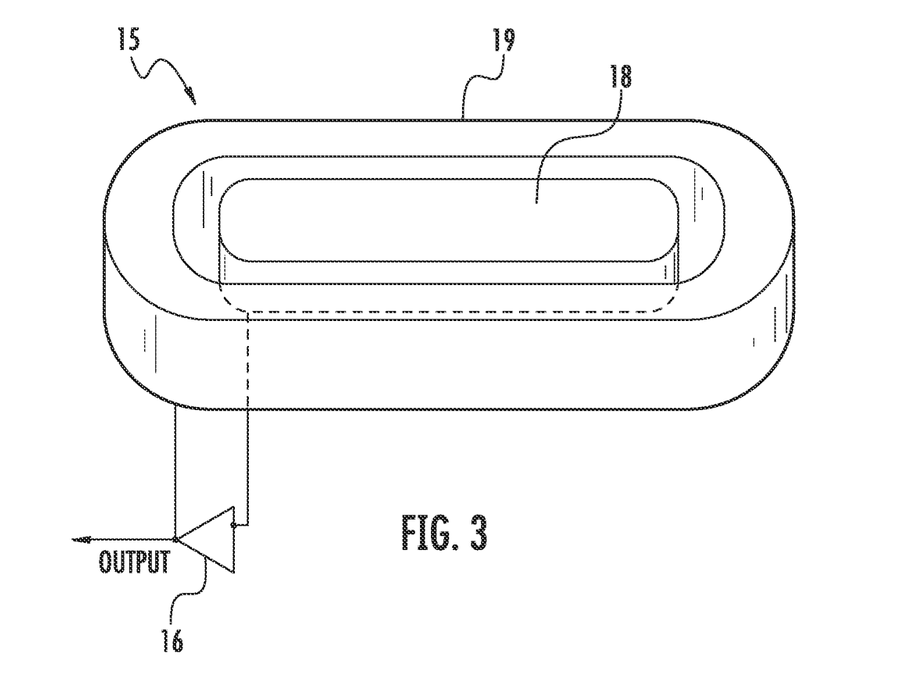
FIG. 3 is a perspective schematic diagram of an electric field sensing pixel of the finger sensing apparatus of FIG. 2.

Referring now additionally, to FIGS. 2 and 3, the finger sensing apparatus 10 illustratively includes an IC substrate 11 and an array 12 of rows and columns of pixels on the IC substrate. Each pixel 15 is selectively operable either in a receiving mode, a transmitting mode, or a mask mode. Each pixel 15 is illustratively an electric field sensing pixel and may be coupled to an amplifier 16 (FIG. 3). Each sensing pixel illustratively includes a center electrode 18 and a surrounding shield electrode 19. Additional details regarding electric field sensing pixels are disclosed in U.S. Pat. No. 5,953,441 to Setlak et al., the entire contents of which are herein incorporated by reference. Other types of pixels may be used as will be appreciated by those skilled in the art.

The receiving mode is for receiving radiation from the user's finger 46 that is positioned adjacent the array 12 of pixels. The transmitting mode is for transmitting radiation into the adjacent user's finger 46. The mask mode is for neither transmitting nor receiving radiation to or from the adjacent user's finger 46.

The finger sensing apparatus 10 also illustratively includes a controller 13 coupled to the array 12 of pixels 15. The controller 13 may be a processor or other computing device, or may be part of a host processor, for example, the processor/driver circuitry 43 of the cellular telephone 40.

The controller 13 selectively operates first pixels in the receiving mode, while operating second pixels in the transmitting mode, and while operating third pixels in the mask mode. More particularly, receiving of a finger biometric, for example, is performed by selectively operating pixels 15 in the receiving mode. The remaining pixels 15 are either selectively operated in the mask mode and bussed, or used to drive or transmit a carrier for driving into the user's finger 46, rather than using an external bezel, drive ring, or drive electrode.

The mask mode advantageously reduces self-interference, or interference caused by pixels 15 being in the receiving and transmitting modes. In other words, pixels 15 selectively operating in the mask mode may operate as a buffer or mask between pixels operating in the transmitting and receiving modes. In some embodiments, the pixels selectively operating in the mask mode or the buffer space, may be about 350 µm wide or about seven pixels wide, for example. In other words, about seven consecutive columns of pixels may be selectively operated in the mask mode and be between both a column of pixels selectively operated in the transmitting mode and a column of pixels selectively operating in the receiving mode. Of course, the mask or buffer may be another width or number of pixels. Several additional columns of pixels, for example, seven, that are positioned on an end of the array 12 near a charge amplifier may optionally be selectively operated in the mask mode to further reduce noise that may be caused by, or introduced upon, the charge amplifier, for example.

As will be appreciated by those skilled in the art, rather than exciting an external bezel or drive ring, selectively operating pixels 15 in the array 12 of pixels, and in particular, in the mask and transmitting modes, advantageously reduces the size and the number of components for the finger sensor apparatus 10, as an external bezel, drive ring, or drive electrode is not needed. By removing the external drive electrode, an amount of pins of the finger sensing IC 11 may be reduced by bringing excitation, or finger drive functions that are typically performed by an external drive electrode, within the finger sensing IC. Still further, other components, such as a resistor, a transient voltage suppressor, and conductive traces, for example, may be removed along with the external drive electrode that may surround the IC substrate. Other components may also not be needed or may be removed, as will be appreciated by those skilled in the art.

Figure 4:
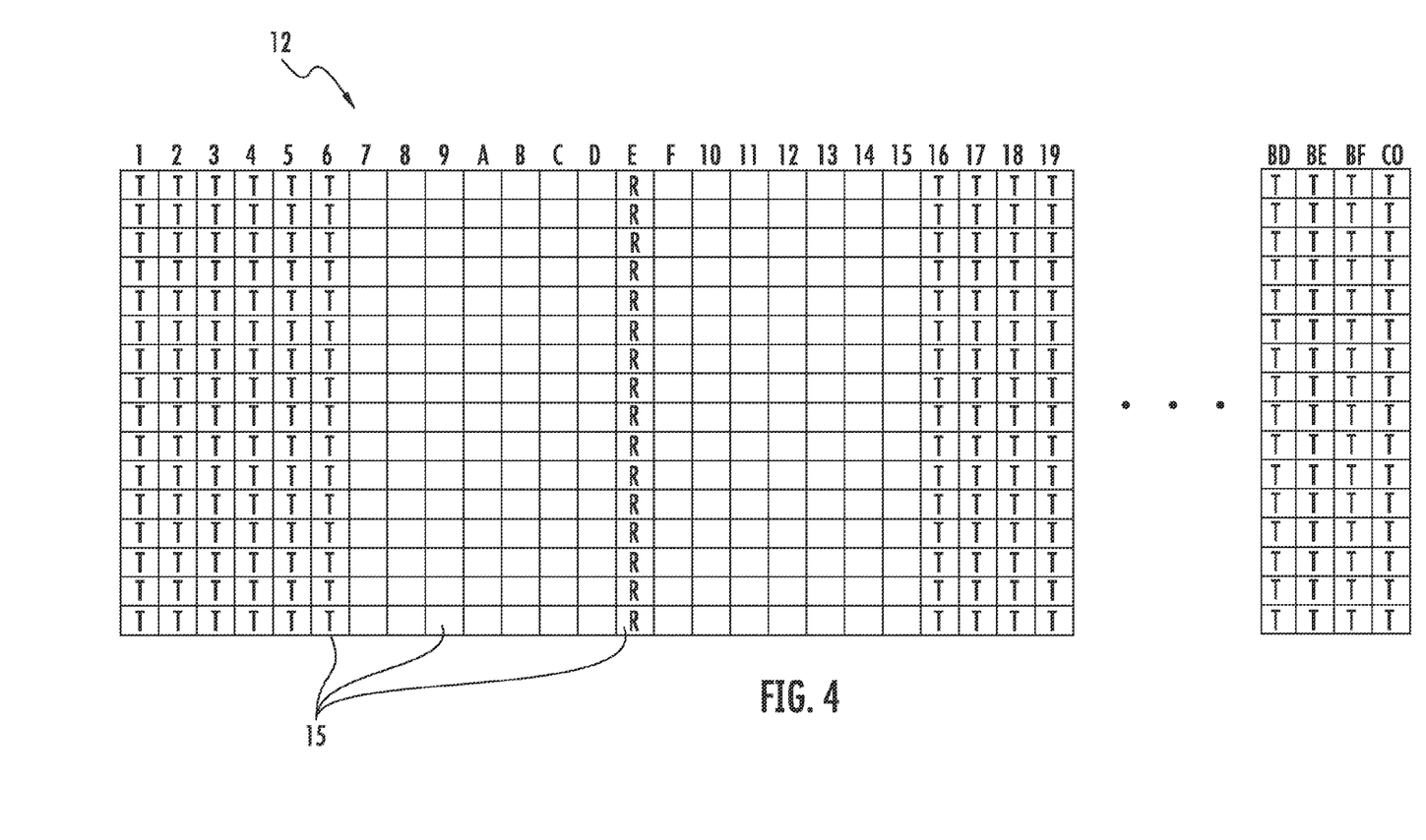
FIG. 4 is a schematic diagram of the array of pixels selectively operated by the controller of the finger sensing apparatus of FIG. 2.

Referring now to FIG. 4, a particularly advantageous arrangement of pixels 15 selectively operated by the controller 13 in the transmitting, sensing, and mask modes is now described. This arrangement advantageously uses the entire array 12 of pixels for excitation (transmitting mode) setting aside columns for selectively operating in the mask mode and a column selectively operating in the receiving mode. Illustratively, one column of pixels is selectively operated in the receiving mode, as shown with the letter R. The column of pixels operating in the receiving mode is adjacent on each side, seven consecutive columns of the array 12 of pixels that are selectively operated in the mask mode, illustratively shown with no letter.

In other words, the column of pixels that is selectively operated in the receiving mode is buffered on each side from the columns of pixels operating in the transmitting mode, illustratively shown with the letter T, by seven columns of pixels selectively operating in the mask mode. Put more simply, the controller 13 selectively operates between the columns of the first and second pixels in the receiving and transmitting mode, at least one column of third pixels in the mask mode. While the column of pixels selectively operating in the receiving mode and the columns of pixels selectively operating in the mask mode are illustratively positioned near a periphery of the array 12 of pixels, the columns of pixels selectively operated in the receiving and mask modes may be positioned elsewhere in the array, for example.

Figure 5:
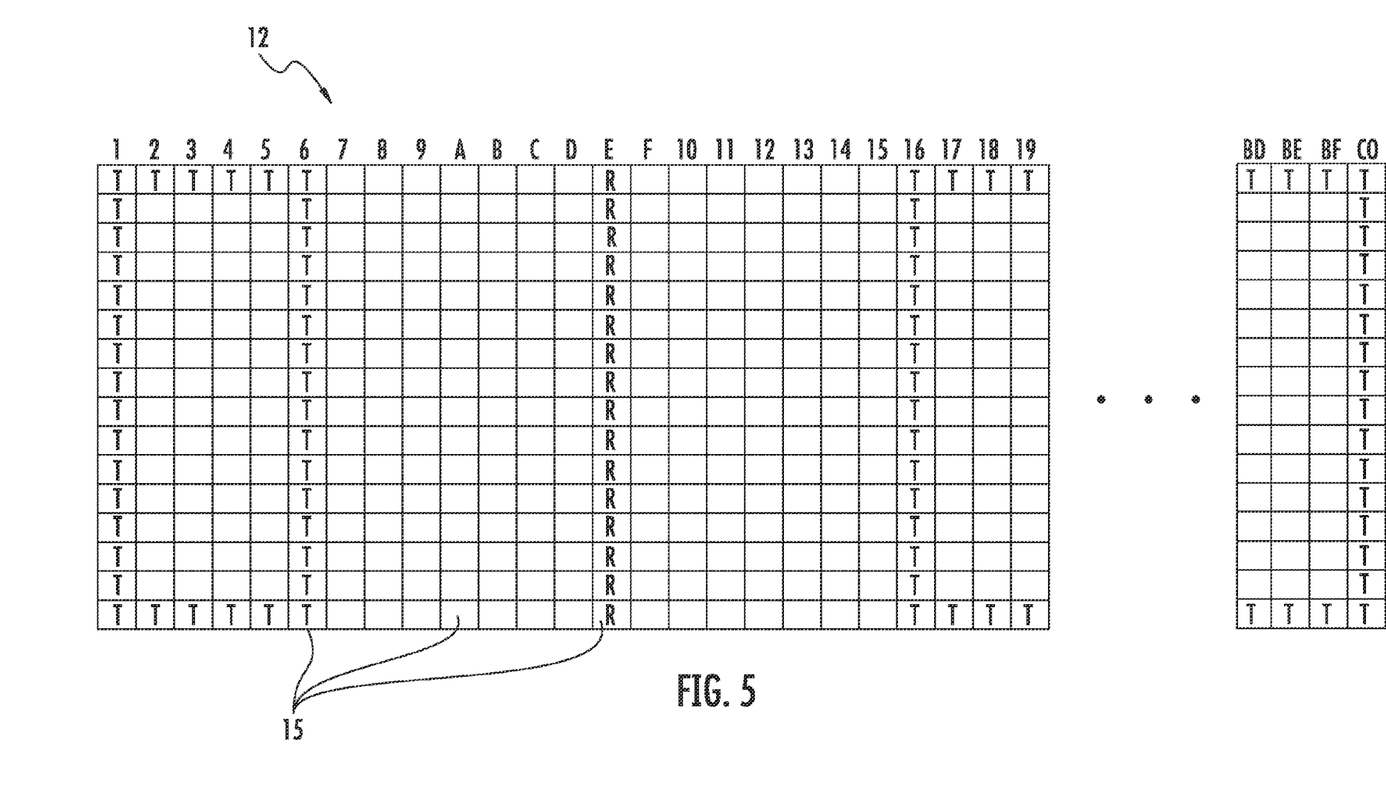
FIG. 5 is another schematic diagram of the array of pixels selectively operated by the controller of the finger sensing apparatus of FIG. 2.

Referring now to FIG. 5, another arrangement of pixels 15 selectively operated by the controller 13 in the transmitting, sensing, and mask modes is described. Illustratively, the controller 13 selectively operates one column of pixels in the receiving mode. The column of pixels selectively operating in the receiving mode is buffered or masked on each side of the column by seven columns of pixels selectively operating in the mask mode.

The controller 13 also selectively operates the remaining columns of pixels to define two rectangles on both sides of the columns of the pixels selectively operating in the transmitting and mask modes. Each rectangle includes a perimeter of pixels selectively operated in the transmitting mode. Pixels 15 within the perimeter of the transmitting mode pixels are selectively operated in the mask mode. One edge of the perimeter of the transmitting mode pixels of each rectangle is illustratively adjacent the seven columns of pixels selectively operating in the mask mode. In other words, the controller 13 selectively operates a plurality of columns of second pixels in the transmitting mode and selectively operates at least one third pixel in the mask mode between the plurality of columns of second pixels in the transmitting mode.

As will be appreciated by those skilled in the art, the controller 13 may selectively define only one rectangle on either side of the columns selectively operating in the receiving and mask modes. This arrangement advantageously allows the finger sensor apparatus 10 to have relatively the same drive area, but a reduced capacitive load, as fewer pixels 15 are operating in the transmitting mode.

Figure 6:
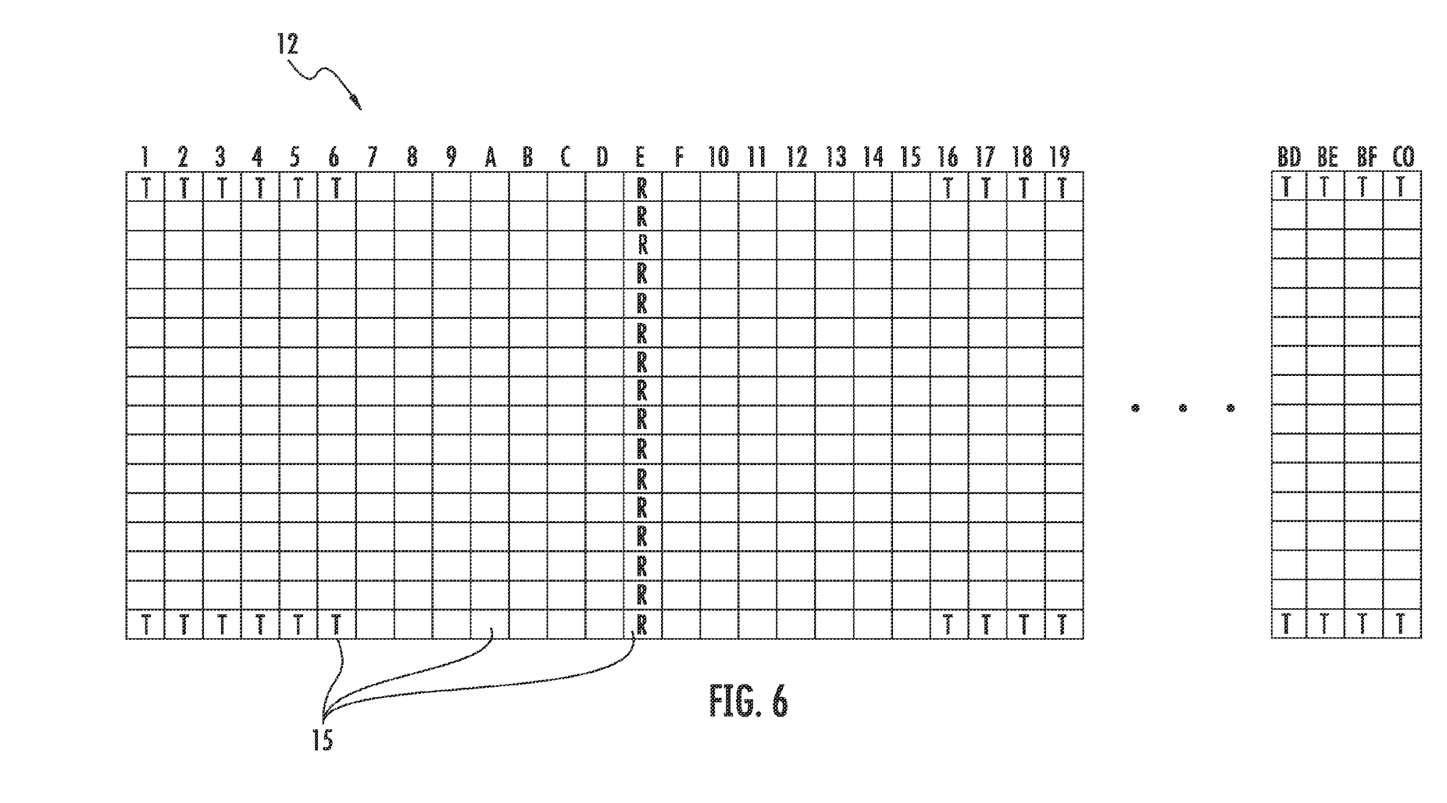
FIG. 6 is another schematic diagram of the array of pixels selectively operated by the controller of the finger sensing apparatus of FIG. 2.

Referring now to FIG. 6, yet another arrangement of pixels 15 selectively operated by the controller 13 in the transmitting, receiving, and mask modes is now described. Illustratively, the controller 13 selectively operates one column of pixels in the receiving mode. The column of pixels selectively operating in the receiving mode is buffered or masked on each side of the column by seven columns of pixels selectively operating in the mask mode.

The controller 13 also selectively operates the pixels 15 of remaining columns to selectively operate a first and last row thereof in the transmitting mode and the remaining rows of that column in the mask mode. In other words, the controller 13 selectively operates the first and last rows of pixels in the array 12 that are on both sides of the columns operating entirely in the sensing and mask modes. This arrangement advantageously allows the finger sensor apparatus 10 to have an even more reduced capacitive load, since as fewer pixels 15 are operating in the transmitting mode.

Figure 7:
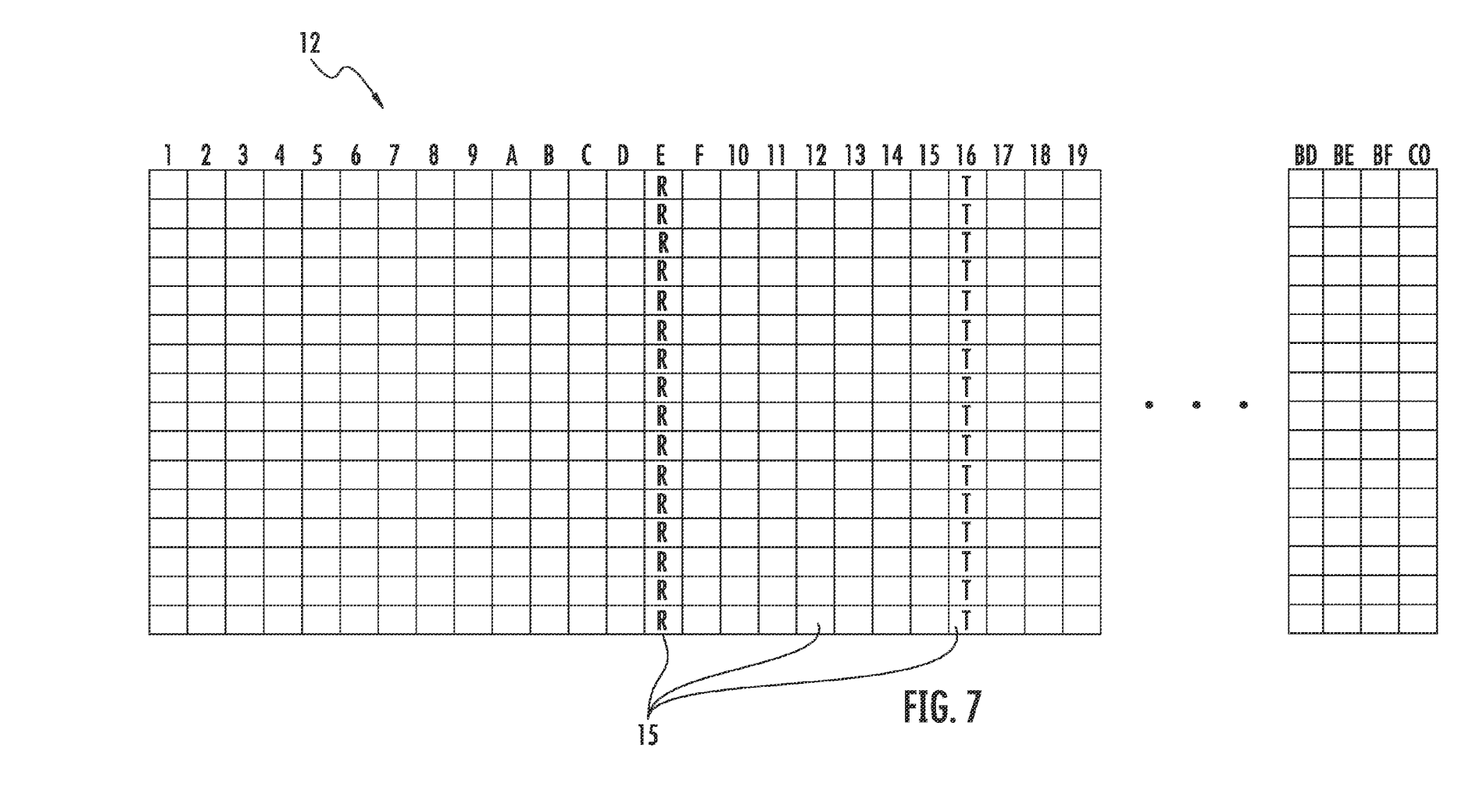
FIG. 7 is yet another schematic diagram of the array of pixels selectively operated by the controller of the finger sensing apparatus of FIG. 2.

Referring now to FIG. 7, still further, another arrangement of pixels 15 selectively operated by the controller 13 in the transmitting, receiving, and mask modes is now described. Illustratively, the controller 13 selectively operates one column of pixels in the receiving mode. The column of pixels selectively operating in the receiving mode is masked, on each side of the column, by seven columns of pixels selectively operating in the mask mode.

The controller 13 also selectively operates a column of pixels 12 in a transmitting mode. The column of pixels operating in the transmitting mode may located anywhere in the array 12 of pixels, at least a mask width away from the column of pixels selectively operating in the receiving mode. In other words, the column of pixels selectively operating in the transmitting mode should be at least seven columns of pixels 15 selectively operating in the mask mode away from the column of pixels operating in the receiving mode. Remaining pixels 15 in the array 12 are selectively operated in the mask mode. This arrangement advantageously allows the finger sensor apparatus 10 to have an even more reduced capacitive load, since as only a single of column of pixels are operating in the transmitting mode.

While several advantageous arrangements of selectively operating the pixels 15 of the array 12 have been disclosed, each of the arrangements may be used in combination with other arrangements, as will be appreciated by those skilled in the art.

A method aspect includes using a controller 13 coupled to an array 12 of pixels on an integrated circuit substrate 11. Each pixel 15 is selectively operable in at least a receiving mode for receiving radiation from an adjacent finger, or a transmitting mode for transmitting radiation into the adjacent finger. The method includes using the controller 13 to selectively operate at least one first pixel in the array of pixels 12 in the receiving mode.

The method also includes using the controller 13 to selectively operate at least one second pixel in the transmitting mode while the at least one first pixel operates in the receiving mode. Each pixel 15 is also selectively operable in a mask mode for neither receiving nor transmitting radiation. The method also includes using the controller 13 to selectively operate at least one third pixel in the mask mode while selectively operating the at least one first and second pixels in the sensing and transmitting modes respectively. The controller may be used to selectively operate each pixel 15 in one of the transmitting, receiving, or mask modes, as described above, as will be appreciated by those skilled in the art.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A finger sensing apparatus comprising:
   an integrated circuit (IC) substrate;
   an array of finger biometric sensing pixels on said IC substrate, each finger biometric sensing pixel switchable to a receiving mode for receiving radiation from an adjacent finger, and a transmitting mode for transmitting radiation into the adjacent finger; and
   a controller coupled to said array of finger biometric sensing pixels for operating at least one first finger biometric sensing pixel in the receiving mode while operating at least one second finger biometric sensing pixel in the transmitting mode.

2. The finger sensing apparatus according to claim 1 wherein each finger biometric sensing pixel is also switchable to in a mask mode for neither receiving nor transmitting radiation; and wherein said controller also operates at least one third finger biometric sensing pixel in the mask mode while operating the at least one first and second finger biometric sensing pixels in the receiving and transmitting modes respectively.

3. The finger sensing apparatus according to claim 1 wherein said controller operates the at least one third finger biometric sensing pixel in the mask mode between the at least one first and second finger biometric sensing pixels in the receiving and transmitting modes respectively.

4. The finger sensing apparatus according to claim 1 wherein said array of finger biometric sensing pixels comprises an array of rows and columns of finger biometric sensing pixels; and wherein said controller operates at least one first column of the first finger biometric sensing pixels in the receiving mode.

5. The finger sensing apparatus according to claim 4 wherein said controller operates at least one second column of second finger biometric sensing pixels in the transmitting mode.

6. The finger sensing apparatus according to claim 5 wherein each finger biometric sensing pixel is also operable in a mask mode for neither receiving nor transmitting radiation; and wherein said controller also operates at least one column of third finger biometric sensing pixels in the mask mode positioned between the at least one first and second columns.

7. The finger sensing apparatus according to claim 2 wherein said array of finger biometric sensing pixels comprises an array of rows and columns of finger biometric sensing pixels; wherein said controller operates a plurality of columns of second finger biometric sensing pixels in the transmitting mode; and wherein said controller operates the at least one third finger biometric sensing pixel between the plurality of columns of second finger biometric sensing pixels.

8. The finger sensing apparatus according to claim 1 wherein the radiation comprises electric field radiation.

9. The finger sensor apparatus according to claim 1 further comprising a finger sensing package surrounding said IC substrate and being devoid of another electrode operated by said controller.

10. A finger sensing apparatus comprising:
an integrated circuit (IC) substrate;
an array of electric field finger biometric sensing pixels on said IC substrate, each electric field finger biometric sensing pixel switchable to a receiving mode for receiving electric field radiation from an adjacent finger, a transmitting mode for transmitting electric field radiation into the adjacent finger, and a mask mode for neither transmitting nor receiving electric field radiation; and
a controller coupled to said array of electric field finger biometric sensing pixels for operating at least one first electric field finger biometric sensing pixel in the receiving mode while operating at least one second electric field finger biometric sensing pixel in the transmitting mode and while operating at least one third electric field finger biometric sensing pixel in the mask mode.

11. The finger sensing apparatus according to claim 10 wherein said controller operates the at least one third electric field finger biometric sensing pixel in the mask mode between the at least one first and second electric field finger biometric sensing pixels in the receiving and transmitting modes respectively.

12. The finger sensing apparatus according to claim 10 wherein said array of electric field finger biometric sensing pixels comprises an array of rows and columns of electric field finger biometric sensing pixels; and wherein said controller operates at least one first column of the first electric field finger biometric sensing pixels in the receiving mode.

13. The finger sensing apparatus according to claim 12 wherein said controller operates at least one second column of second electric field finger biometric sensing pixels in the transmitting mode.

14. The finger sensing apparatus according to claim 13 wherein said controller also operates at least one third column of third electric field finger biometric sensing pixels positioned between the at least one first and second columns.

15. The finger sensing apparatus according to claim 10 wherein said array of electric field finger biometric sensing pixels comprises an array of rows and columns of electric field finger biometric sensing pixels;
wherein said controller operates a plurality of columns of second electric field finger biometric sensing pixels in the transmitting mode; and wherein said controller operates the at least one third electric field finger biometric sensing pixel between said the plurality of columns of second electric field finger biometric sensing pixels.

16. The finger sensor apparatus according to claim 10 further comprising a finger sensing package surrounding said IC substrate and being devoid of another electrode operated by said controller.

17. A method of using a finger sensing apparatus comprising a controller coupled to an array of finger biometric sensing pixels on an integrated circuit substrate, each finger biometric sensing pixel being switchable to a receiving mode for receiving radiation from an adjacent finger, and a transmitting mode for transmitting radiation into the adjacent finger, the method comprising:
using the controller to operate at least one first finger biometric sensing pixel in the receiving mode while operating at least one finger biometric sensing second pixel in the transmitting mode.

18. The method according to claim 17 wherein each finger biometric sensing pixel is also operable in a mask mode for neither receiving nor transmitting radiation; and wherein the method further comprises using the controller to operate at least one third finger biometric sensing pixel in the mask mode while operating the at least one first and second finger biometric sensing pixels in the sensing and transmitting modes respectively.

19. The method according to claim 18 wherein using the controller to operate at least one third finger biometric sensing pixel in the mask mode comprises using the controller to operate the at least one third finger biometric sensing pixel in the mask mode between the at least one first and second finger biometric sensing pixels in the receiving and transmitting modes respectively.

20. The method according to claim 18 wherein the array of finger biometric sensing pixels comprises an array of rows and columns of finger biometric sensing pixels; wherein using the controller to operate at least one second finger biometric sensing pixel in the transmitting mode while operating the at least one first finger biometric sensing pixel in the receiving mode comprises using the controller to operate a plurality of columns of second finger biometric sensing pixels in the transmitting mode; and wherein using the controller to operate the at least one third finger biometric sensing pixel in the mask mode comprises using the controller to operate the at least one third finger biometric sensing pixel between the plurality of columns of second finger biometric sensing pixels.

21. The method according to claim 17 wherein the array of finger biometric sensing pixels comprises an array of rows and columns of finger biometric sensing pixels; and wherein using the controller to operate the at least one first finger biometric sensing pixel in the receiving mode comprises using the controller to operate at least one first column of the first finger biometric sensing pixels in the receiving mode.

22. The method according to claim 21 wherein using the controller to operate at least one second finger biometric sensing pixel in the transmitting mode comprises using the controller to operate at least one second column of second finger biometric sensing pixels in the transmitting mode.

23. The method according to claim 22 wherein each finger biometric sensing pixel is also operable in a mask mode for neither receiving nor transmitting radiation; and wherein the method further comprises using the controller to also operate at least one third column of third finger biometric sensing pixels in the mask mode positioned between the at least one first and second columns.

* * * * *